United States Patent [19]
Dillard

[11] Patent Number: 5,487,700
[45] Date of Patent: Jan. 30, 1996

[54] POULTRY SHACKLE WITH ROTATABLE STIRRUPS

[75] Inventor: Kenneth D. Dillard, Canton, Ga.

[73] Assignee: Dapec, Inc., Canton, Ga.

[21] Appl. No.: 498,980

[22] Filed: Jun. 6, 1995

[51] Int. Cl.$^6$ ............................................... A22C 21/00
[52] U.S. Cl. ........................................ 452/188; 452/179
[58] Field of Search .................................. 452/188, 185, 452/187, 189, 192, 183, 179, 180, 182

[56] References Cited

U.S. PATENT DOCUMENTS

| | | | |
|---|---|---|---|
| 3,166,785 | 1/1965 | Lemmond | 452/183 |
| 3,593,368 | 7/1971 | Cox | 452/188 |
| 3,684,078 | 8/1972 | Nielsen | 452/188 |
| 3,686,712 | 8/1972 | Lewis | 452/188 |
| 4,351,087 | 9/1982 | Altenpohl et al. | 452/183 |
| 5,092,815 | 3/1992 | Polkinghorne | 452/179 |
| 5,125,498 | 6/1992 | Meyn | 452/183 |
| 5,366,406 | 11/1994 | Hobbel et al. | 452/179 |

Primary Examiner—Willis Little
Attorney, Agent, or Firm—Hopkins & Thomas

[57] ABSTRACT

An improved poultry shackle assembly for suspending poultry carcasses by their hocks from an overhead conveyor system for movement along a poultry processing line comprises a support frame from which a pair of spaced stirrups depend. Each of the stirrups has an upwardly extending rod that is journaled within a cylindrical sleeve on the support frame for rotation of the stirrup to accommodate spreading and rotation of the legs of a poultry carcass suspended therefrom. A pin extends outwardly from the rods through an inclined slot formed in the sleeves to restrict rotational movement of the stirrups between first and second rotary positions and to bias the stirrups gravitationally to a first rotary position wherein the pins are nestled within the bottom ends of the slots.

12 Claims, 3 Drawing Sheets

POULTRY SHACKLE WITH ROTATABLE STIRRUPS

This invention relates generally to poultry processing equipment and more particularly to shackles for suspending poultry carcasses by their hocks for transportation of the carcasses along the overhead conveyor system of a poultry processing line.

BACKGROUND OF THE INVENTION

In modern poultry processing plants, chickens, turkeys, and other types of poultry raised for commercial slaughter are moved through a poultry processing plant where they are sequentially defeathered, eviscerated, cut up, and packaged for shipment to wholesale and retail consumers. In such a plant, it is common for the poultry carcasses to be suspended by their ankle bones or hocks from a shackle assembly. Most shackle assemblies in such machines have a pair of spaced depending stirrups that are configured to receive and releasably hold the hocks of the birds. In this way, workers can suspend birds from the shackles by slipping their hocks into the stirrups. The shackle assemblies, in turn, are mounted in spaced relationship to an overhead conveyor system that moves through the various processing stations of the poultry line. The shackles are spaced along the overhead conveyor line so that birds suspended from the shackles are moved sequentially through the stations for serial processing of large numbers of carcasses.

As poultry carcasses are processed at the various processing stations of a poultry line, the carcasses are manipulated in various ways to accommodate each of the processing steps. In some of these stations, it is desirable and efficient to spread the legs of the carcass as far apart as possible to accommodate, for example, a blade, scraper, or other implement that operates on the carcass at the station. In many instances, the legs can be spread sufficiently with a spreader bar or the like as they move along the overhead conveyor. However, in a significant number of instances, and in particularly where the carcass is larger than average, the spreading of the legs will cause the hocks or the leg bones of the bird to break near the point at which they are suspended from the shackle stirrups. This is because most shackle stirrups used in modern poultry processing machines are designed to allow the legs of the bird to swing freely to and fro in the direction of conveyor movement while holding the hocks firmly in the lateral or side-to-side direction to restrict lateral movement of the legs. Thus, excessive spreading of the bird's legs, which can easily occur with a large carcass, will cause the hocks of the bird to bind within the stirrups, resulting in fracture or breakage of the hock or leg bone.

Breakage of hocks and legs in the manner just described is highly undesirable for a number of reasons. First, in many instances the broken hock or leg will allow the carcass to be pulled out of its stirrups as it is processed. This can clog the processing machinery and may require that the entire line be shut down to clean out the dislodged carcass. Further, even if the carcass does not become dislodged from its shackle, the broken bone renders the resulting chicken leg unmarketable for human consumption and it must be sold for some other less profitable use.

Accordingly, there exists a need for an improved poultry shackle assembly designed to receive and hold the hocks of a suspended bird in the normal way while at the same time permitting the hocks, when necessitated by spreading forces imparted to legs of the bird, to swing relatively freely without binding in the side to side or lateral direction as well as in the to and fro direction. Such a shackle should allow workers to hang the birds from their hocks in the normal way and should ensure that the birds remain properly oriented as they move into and out of the various processing stations. In addition, the shackle should accommodate rotation of the bird's legs to orient its knees outwardly, thus enhancing the spreadability of the legs and improving their orientations relative to the saddle of the carcass for more efficient processing. Finally, such a shackle should be simple, reliable, automatic in operation, and economical to manufacture and use in a poultry processing plant. It is to the provision of such an improved shackle assembly that the present invention is primarily directed.

SUMMARY OF THE INVENTION

Briefly described, the present invention, in a preferred embodiment thereof, comprises a poultry support shackle assembly for transporting a poultry carcass, suspended by its hocks, along the overhead conveyer system of a poultry processing line. The shackle assembly includes a support frame that is designed to be coupled to the overhead conveyer system of the poultry processing line. A pair of spaced-apart stirrup members depend from the support frame. Each of the stirrup members is configured to receive and releasably hold a corresponding hock of the poultry carcass so that the carcass becomes suspended by its hocks and legs from the stirrup members. In the preferred embodiment, each of the stirrup members is formed from a metal rod bent to the proper shape. The bottom end of each stirrup member is bent to form a generally U-shaped open cradle configuration for receiving the hock of a poultry carcass. A straight rod section of the stirrup member extends upwardly from the bottom end and is mounted to the support frame as described below. With this configuration, it will be seen that the stirrup members depend from the support frame in spaced transversely aligned relationship. Other stirrup designs are possible.

The straight rod section at the top end of each stirrup member is rotatably journaled within a vertical tubular sleeve fixed to the support frame. Each of the stirrups is thus rotatable about a vertical axis that extends generally along the stirrup member. Each of the sleeves is machined with an inclined slot having upper and lower end portions. A metal pin is firmly fixed within the straight rod section of each stirrup member and extends outwardly therefrom through the inclined slot of the corresponding sleeve. In this way, the stirrup member is secured within the sleeve and restricted in rotational range between a first rotary orientation wherein the pin is at one end of the slot and a second rotary orientation wherein the pin is at the other end of the slot.

Further, the weight of each stirrup and the weight of a poultry carcass suspended therefrom forces the pin to ride down the inclined slot of the sleeve to the lower end portion thereof. When the pin is located at the lower end portion of the slot, the bottom end of the stirrup is oriented in the normal direction allowing to and fro movement of the carcass while restricting side to side or lateral movement thereof. However, when, in a particular processing step, outward pressure is applied to the thighs of the carcass to spread the legs, such pressure causes the top ends of the shackles to rotate within their sleeves so that their pins move up the inclined slot to the upper end portion thereof. This allows the knees of the bird to rotate outwardly for more efficient spreading of the legs and also turns the cradles so that the hocks can swing within the stirrups in the side-to-side direction. As a result, the hock of the bird does not bind within the stirrup and thus does not break as the legs are spread apart.

As the carcass moves through and out of the station where spreading of the legs is required, the natural weight of the stirrups and the carcass again causes the pins of the stirrup to ride down the inclined slots of the sleeves to reposition the stirrups in their normal orientation. It can thus be seen that the improved shackle and stirrup assembly of the present invention suspends the carcasses of birds in the normal way as they move along the conveyer but allows the legs of the bird to be spread freely and without breakage when necessary for processing stages where such spreading is required.

Therefore, it is an object of the present invention to provide an improved poultry shackle assembly that greatly reduces the breakage common in prior art assemblies when the legs of a carcass suspended from the shackle are spread apart.

It is another object of the invention to provide an improved poultry shackle wherein the legs of a suspended bird can be spread and rotated simultaneously to position the knees of the bird so that they are directed outwardly allowing the bird's legs to spread more easily and more widely.

A further object of the invention is to provide a poultry shackle with rotatable stirrups that functions automatically to allow rotation and spreading of a bird's legs when necessary while returning the legs of the bird to their normal orientations when spreading is not necessary.

Still another object of the invention is to provide an improved poultry shackle with rotatable stirrups that is simple and elegant in design, reliable in operation, and economical to produce and use in large quantities in a modern poultry processing plant.

These and other objects, features, and advantages of the invention will become apparent upon review of the specification hereof when taken in conjunction with the accompanying drawings, which are briefly described as follows.

DETAILED DESCRIPTION OF THE PREFERRED EMBODIMENT

Figure 1:
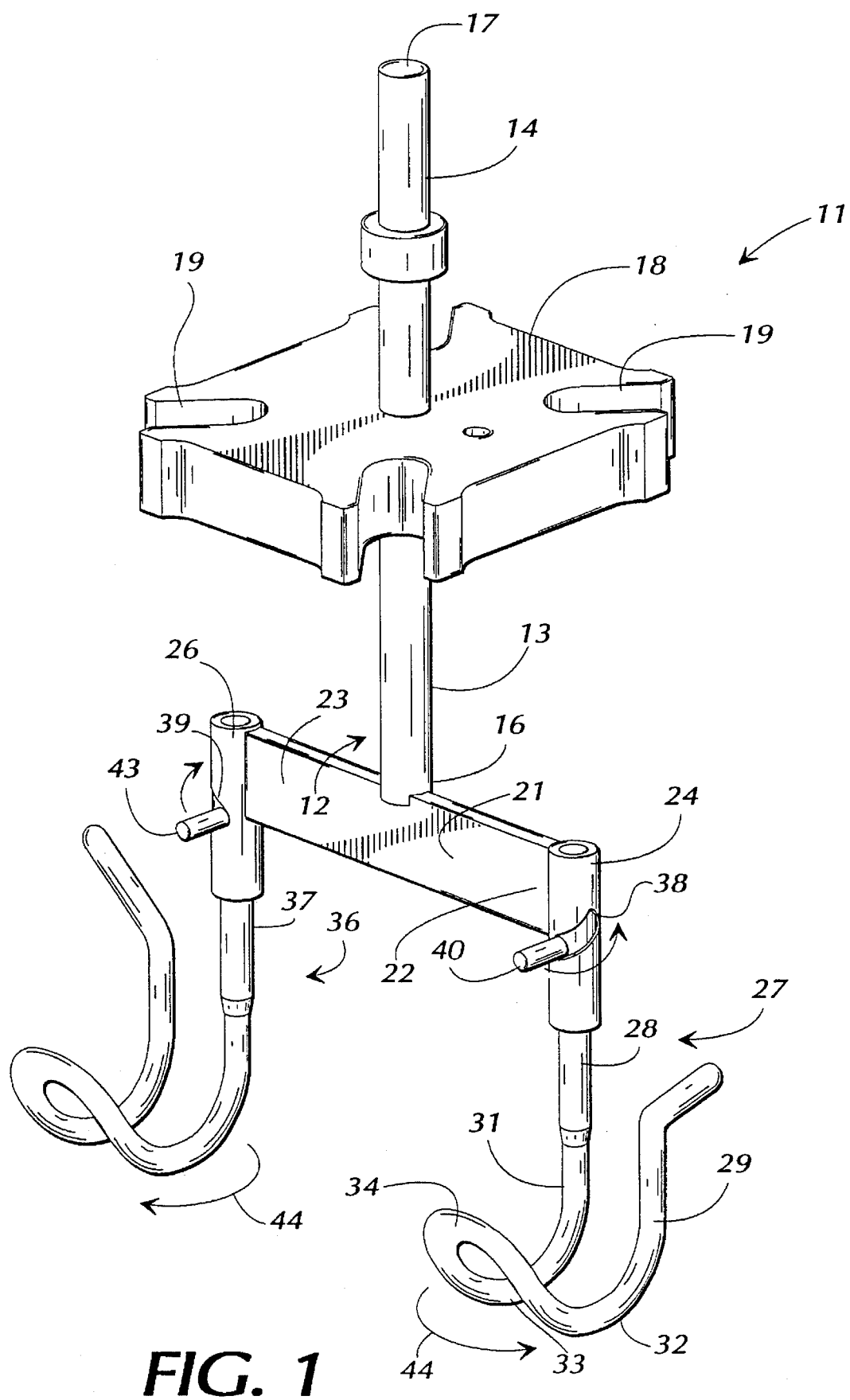
FIG. 1 is a perspective view of a poultry shackle assembly that embodies principles of the present invention in a preferred form.

Referring now in more detail to the drawings, in which like numerals refer to like parts throughout the several views, FIG. 1 illustrates a poultry shackle assembly 11 that embodies principles of the present invention in a preferred form. The shackle assembly 11 comprises a support frame 12 adapted to be coupled to the overhead conveyor system of a poultry processing line. The support frame 12 is formed with a vertical rod 13 having an upper end portion 14 and a lower end portion 16. The upper end portion 14 has a longitudinally threaded bore 17 adapted for threadingly receiving a coupling bolt of an overhead conveyor system. In this way, the support frame 12 can be suspended from the overhead conveyor system for movement of the shackle assembly along the processing line. While a threaded rod is illustrated in the preferred embodiment for attaching the assembly to an overhead conveyor, it will be understood that various alternate means of mounting the assembly to the overhead conveyor might be employed with equally acceptable results. Thus, any means for coupling the assembly to the overhead conveyor is anticipated by this invention and the threaded rod shown in the preferred embodiment is not a limiting feature of the invention.

A four pointed star 18 is fixed to the vertical rod 13 intermediate its ends. The star 18 preferably is fabricated from teflon or nylon or a similar material and each of its points is provided with a slot 19. Since the star 18 in this embodiment is formed in the general shape of a square, the slots 19 are oriented 90° apart. As the shackle assembly 11 moves along with the overhead conveyor system of a poultry processing line, the slots 19 are engaged by pins positioned at strategic locations to rotate the entire shackle assembly in 90° increments. This is useful when, for example, the shackle assembly needs to be rotated to the side so it can be loaded with a bird by a worker or when the shackle assembly and a bird suspended therefrom need to be turned around for a particular process operation. Such stars are common in poultry processing shackles and may be provided with fewer or more than four points to accommodate incremental rotation of the assembly through more or less than 90° increments respectively.

The lower end portion 16 of the rod 13 is welded or otherwise firmly fixed to a transverse bar 21 that extends laterally with respect to the rod 13 to a first end 22 and a second end 23. A first vertically oriented tubular sleeve 24 is welded or otherwise fixed to the first end 22 of the bar 21. Similarly, a second vertically oriented tubular sleeve 26 is welded or otherwise fixed to the second end 23 of the bar 21. The sleeves 24 and 26 are thus positioned in spaced parallel relationship with respect to each other.

A first stirrup member 27 is formed of an appropriately bent metal rod and has a vertical shaft 28 that extends upwardly from a convoluted lower portion of the stirrup member. The lower portion of the stirrup member forms a generally open U-shaped cradle for receiving the hock of poultry carcass to be suspended from the shackle. More particularly, the lower portion of the stirrup assembly 27 is formed with spaced parallel legs 29 and 31 that extend downwardly to bight portions 32 and 33, and then upwardly to a common terminal end 34. Similarly, a second stirrup member 36 has a vertical shaft 37 and a lower portion that is formed to define a cradle in the same way as the first stirrup member 27. It will be seen that a poultry carcass can be suspended from the shackle assembly 11 by slipping its hocks down between the parallel legs 29 and 31 until the hock is captured between the bight portions 32 and 33.

The shafts 28 and 37 of the stirrup members 27 and 36 are rotatable journaled within the first and second sleeves 24 and 26 respectively. Each of the sleeves 24 and 26 is formed with a respective inclined slot 38 and 39 (best shown in FIGS.

2–4). The configuration of these slots is illustrated with respect to the second slot 39 in FIG. 2. Here, the slot 39 is seen to incline upwardly from a bottom end 41 adjacent the inside of the sleeve 26 to a top end 42 adjacent the outside of the sleeve 26. A metal pin 43 is fixed to and extends outwardly from the shaft 37 of the stirrup through the slot 39. The pin 43 secures the shaft 37 in place within the sleeve 26. In addition, movement of the pin 43 along the length of the slot 39 allows the shaft 37 and thus the stirrup 36 to rotate about a vertical line extending along the length of the stirrup member. The limit of this rotation is defined by the length of the slot since rotation is confined to a range between a first rotary position of the stirrup member where the pin 43 is located at the lower end of the slot and a second rotary position when the pin 43 is located at the upper end of the slot. Further, the inclined orientation of the slot 39 biases the pin 43 to the bottom end of the slot by the shear weight of the stirrup member. Thus, the stirrup member is biased by the inclined slot and pin to the predetermined rotary position in which the pin is nestled within the bottom end 41 of the slot 39.

Figure 2:
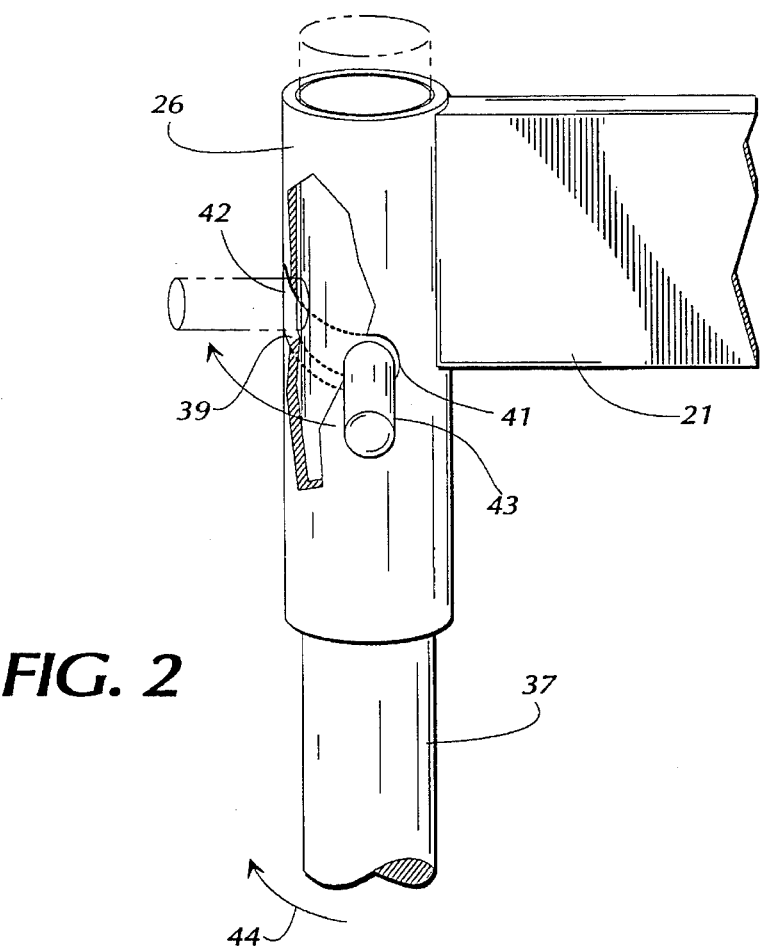
FIG. 2 is a perspective partially cut-away view of the top end of one stirrup of the assembly of FIG. 1 showing rotational movement thereof.

The pin and slot configuration has been defined with reference to FIG. 2 for the second stirrup member 36 and second sleeve 26. It will be understood that the same configuration and thus the same description applies to the first stirrup member 27 and first sleeve 24 as well. With the just described configuration, it will be clear to those of skill in this art that the stirrup members 27 and 36 are mounted to the support frame for rotation about substantially vertical axises that extend along the lengths of the stirrup members. More particularly, the stirrup members are rotatable in outwardly opposed directions as directed by arrows 44 in FIG. 1 between first rotary orientations wherein the pins are nestled within the bottom ends of their slots and second rotary orientations wherein the pins are nestled at the top ends of their slots. Furthermore, the stirrup members 27 and 36 are naturally biased by the force of gravity to their first rotary orientations. The first rotary orientation of stirrup member 36 is depicted as a solid line in FIG. 2 and its second rotary orientation is depicted as a phantom line in FIG. 2.

Figure 3:
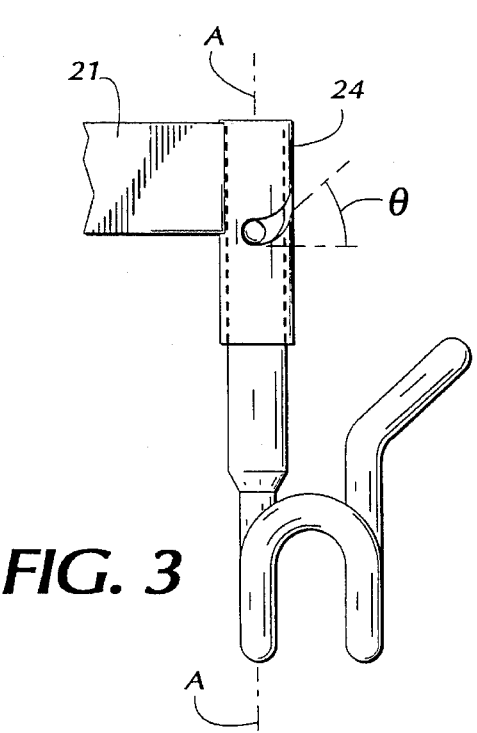
FIG. 3 is a front elevational view of one of the stirrups of this invention shown in its normal operating orientation.
Figure 4:
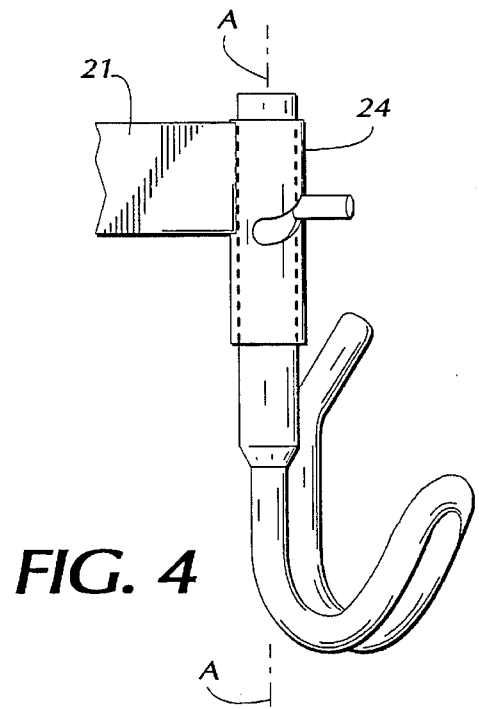
FIG. 4 is a front elevational view of one of the stirrups of this invention show in its rotated orientation for allowing spreading and rotation of the legs of a suspended bird.

FIGS. 3 and 4 illustrate better the two rotary orientations between which the stirrup members are free to move. In FIG. 3, the stirrup member is seen in its naturally biased orientation with its pin nestled within the bottom end of the corresponding slot. FIG. 4 illustrates the stirrup member in its outwardly rotated orientation with the pin nestled at the top end of the slot. When forming the slot in the sleeve 24, it has been found that the angle of the slot θ with respect to the horizontal is important. The slot needs to be inclined at a sufficiently large angle to insure that the weight of the stirrup member causes the pin to ride down the slot to the lower end thereof thus naturally biasing the stirrup member to its first predetermined rotary orientation. At the same time, the angle θ needs to be sufficiently small to ensure that excessive force is not required to rotate the stirrup member outwardly against the biasing force of gravity. In this regard, it has been found that an inclined angle for the slot of between 25° and 40° functions well. However, inclined angles outside this range may also be employed depending on the particular requirements of the processing line in which the shackle of this invention is to be used.

Figure 6:
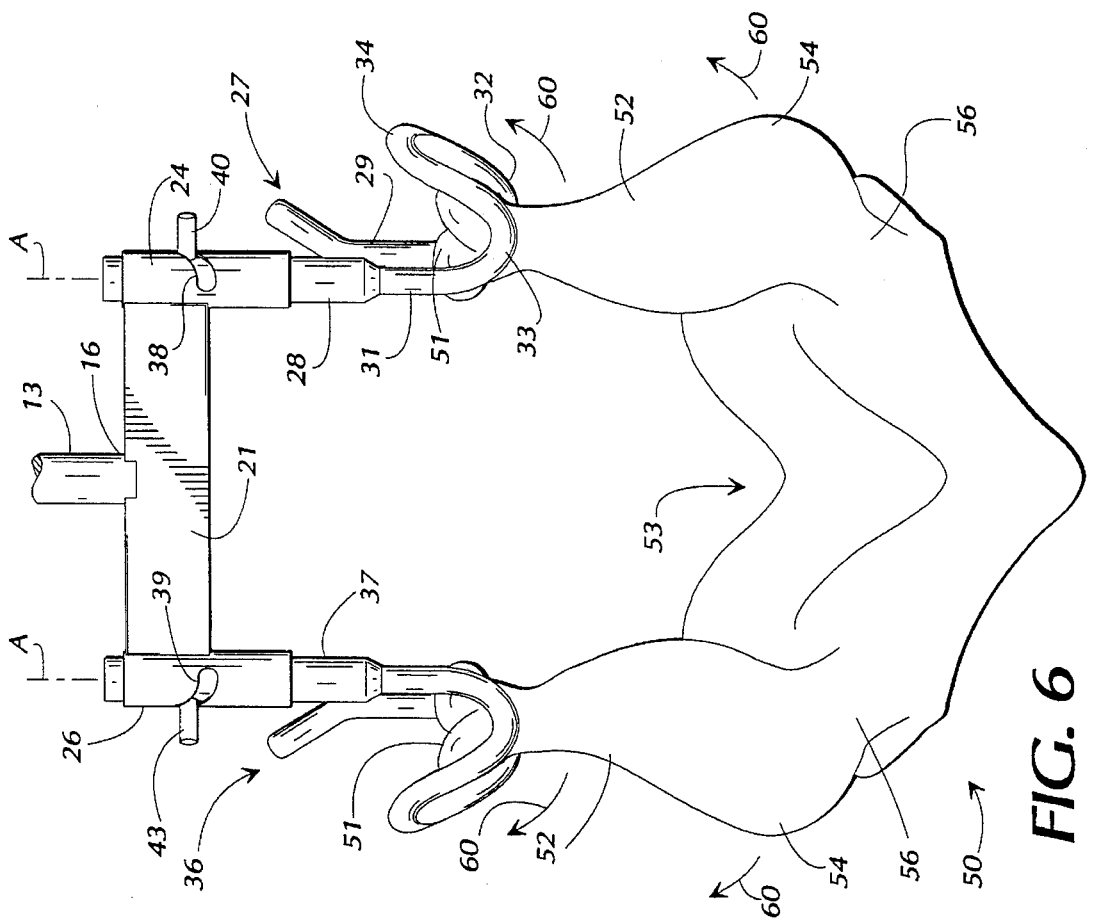
FIG. 6 is a front elevational view depicting the automatic rotation of the stirrups of this invention upon application of spreading forces to a carcasses legs to rotate the stirrups to accommodate lateral movement of the legs.

The operation of the present invention will be described with reference to FIGS. 5 and 6. In these figures, a poultry carcass 50 is shown suspended by its hocks 51 and legs 52 from stirrup members 27 and 36 respectively. The carcass has a saddle portion 53 that corresponds to the torso, back, and breast of the bird. Each of the legs 52 of the carcass has a knee joint located approximately at 54 and a hip joint, which joins the legs to the saddle, located approximately at 56.

Figure 5:
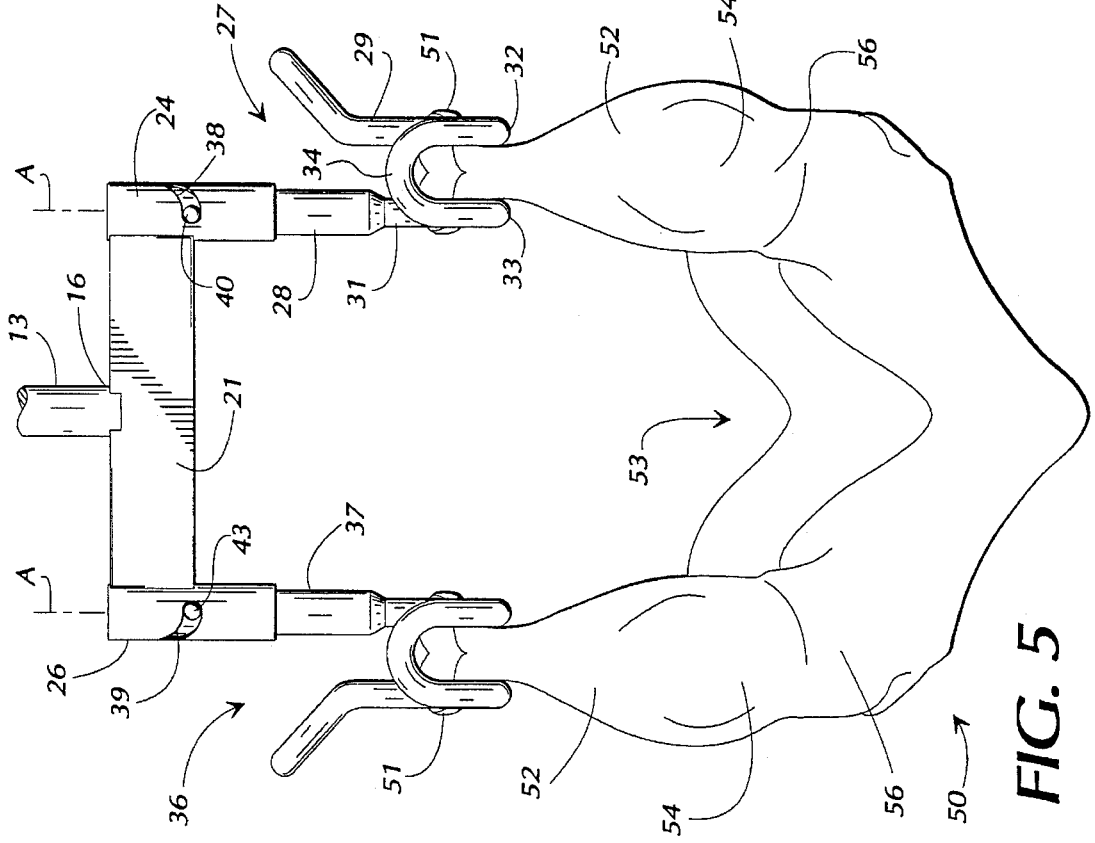
FIG. 5 is a front elevational view depicting a poultry carcass suspended by its hocks from the stirrups of the present invention with the stirrups oriented by the weight of the bird and the stirrups in their normal directions.

In FIG. 5, the carcass 50 is suspended by its hocks 51 from the stirrup members 28 and 37. In this figure, the stirrup members are in their naturally biased forward facing orientations with the pins 40 and 43 located at the bottom ends of slots 38 and 39. The carcass 50 was previously loaded by a worker into the shackle assembly 11 by sliding the hocks of the carcass downwardly through the opposed legs of the stirrup members and between the bight portions thereof. It can be seen from FIG. 5 that, with the stirrups in this orientation, the hocks of the carcass are relatively free to swing to and fro within the stirrup members but are confined between the bight sections of the stirrups against substantial side to side motion. As previously discussed, this restricted side to side movement is desirable during many processing steps but can result in significant breakage of hocks and leg bones with prior art shackles when lateral spreading of the legs is required.

As the carcass 50 is conveyed along on the shackles of FIG. 5, certain operations that do not require spreading of the legs can be performed on the carcass in the normal way. For these operations, the weight of the carcass and the weight of the stirrup members biases the stirrups firmly in their normal positions shown in FIG. 5. However, in some operations, the machinery operating on the carcass functions to spread the legs of the carcass apart. The results of such spreading is illustrated in FIG. 6. The outward force on the inner thighs of the carcass tends to rotate the hip joints 56 of the carcass so that the knees 54 turn outwardly with respect to each other. Prior art shackles resist such rotation of the legs. However, this tendency of the legs to rotate causes the stirrups of the present invention to rotate in turn with the pins 40 and 43 riding up the inclined slots 38 and 39 to the top ends thereof. In addition to accommodating the rotation of the legs, the resulting positioning of the stirrups as depicted in FIG. 6 also allows the hocks 51 of the carcass to swing laterally in a back and forth motion as indicated by arrows 60 in FIG. 6.

Thus, it is seen that the rotatability of the stirrup members allows the legs to rotate naturally as they are spread to position the knees of the carcass in opposed outwardly facing relationship. At the same time, rotation of the stirrups to the positions shown in FIG. 6 permits the hocks to swing back and forth in the lateral direction for even more spreading of the legs without the danger of breaking the hocks or leg bones.

An example of a processing step in which the just described articulated motion of the stirrups is advantageous is the severing of the legs at their hip joints from the saddle portion of the carcass. With the shackle of the present invention, the legs can easily be spread and rotated so that a clean cut can be made at the hip joint leaving the legs of the carcass dangling free from the shackle. When the carcass moves out of the machine that performs the spreading and severing operation, the weight of the stirrups and the suspended legs causes the pins 40 and 43 to ride back down their slots to their normal resting positions, thus realigning the legs properly for subsequent operations.

The invention has been described herein in terms of preferred embodiments and methodologies. It will be obvious to those of skill in the art, however, that numerous additions and modifications might be made to the illustrated embodiments within the scope of this invention. For example, vertical rods journaled within sleeves have been illustrated as the preferred method of mounting the stirrups to the support frame for rotation about a vertical axis. Clearly, other mounting means might also be employed with similar end results. In addition, bent rod type stirrup members have been illustrated since they are most common and have proven to be superior in poultry processing operations. However, other forms of stirrup members might also be used such as stamped stirrups, machined stirrups, or other configurations for receiving and holding the hocks of a poultry carcass. These and other additions, deletions, and modifications might well be made to the illustrated embodiments without departing from the spirit and scope of the invention as set forth in the claims.

I claim:

1. A poultry support shackle assembly for transporting a poultry carcass along the overhead conveyer system of a poultry processing line, said shackle assembly comprising:

a support frame adapted to be coupled to the overhead conveyor system;

a pair of spaced apart stirrup members depending from said support frame with each of said stirrup members being adapted to receive and releasably hold a corresponding hock of the poultry carcass to suspend the carcass by its hocks and legs from the stirrup members;

mounting means for mounting at least one of said stirrup members to said support frame for rotation about a substantially vertical axis extending along said at least one stirrup member so that the poultry hock and leg suspended from said stirrup member are free to rotate to accommodate rotation and spreading of the legs of the poultry carcass that occurs during processing of the carcass.

2. The poultry support shackle assembly of claim 1 and wherein said at least one stirrup member has a substantially vertical shaft and wherein said mounting means includes a substantially vertically oriented sleeve on said support frame for rotatably receiving said shaft of said at least one stirrup member.

3. The poultry support shackle assembly of claim 2 and further comprising means for biasing said at least one stirrup member to a predetermined rotary position.

4. The poultry support shackle assembly of claim 3 and wherein said means for biasing said at least one stirrup member comprises a slot formed in the wall of said sleeve and a pin projecting from said vertical shaft of said at least one stirrup member through said slot, said slot being inclined at a predetermined angle so that downward force on said stirrup member causes said pin to ride down said inclined slot to position said at least one stirrup member at a predetermined rotary position relative to said sleeve.

5. The poultry support shackle assembly of claim 4 and wherein each of said stirrup members is mounted to said support frame for rotary movement about a substantially vertical axis to accommodate rotation and spreading of both legs of a poultry carcass suspended from said shackle assembly.

6. A poultry support shackle assembly as claimed in claim 4 and wherein said predetermined angle is selected to be in the range from about 25 degrees to about 40 degrees.

7. In a poultry shackle for conveying poultry carcasses suspended by their hocks along the overhead conveyer system of a poultry processing line, the improvement comprising a support frame adapted to be coupled to the overhead conveyer system, a pair of spaced stirrups depending from said support frame with each stirrup having a bottom end configured to receive and releasably hold a corresponding hock of a poultry carcass and a top end movably mounted to said support frame, whereby movement of the legs and hocks of the carcass during processing is accommodated by the movably mounted stirrups to reduce breakage of the hocks and leg bones.

8. The improvement of claim 7 and wherein said top end of each of said stirrups is mounted for rotational movement about a substantially vertical axis extending along the stirrup to accommodate rotary movement of the hocks and legs of a poultry carcass suspended from the shackle.

9. The improvement of claim 8 and wherein said support frame includes a pair of spaced substantially vertically oriented sleeves and wherein said top end of each of said stirrups is rotatably journaled within a corresponding one of said sleeves.

10. The improvement of claim 9 and further comprising means for restricting the range of rotational movement of said stirrups.

11. The improvement of claim 10 and wherein said means for restricting the range of rotational movement of said stirrups comprises a slot having first and second ends formed in each of said sleeves and a pin fixed to said top end of each of said stirrups extending laterally through a corresponding one of said slots, the rotational movement of said stirrups being restrained by the limits of movement of said pins within said slots.

12. The improvement of claim 11 and wherein said slots are angled having an upper end and a lower end so that downward force on said stirrups causes the stirrups to rotate to a predetermined rest position with said pins nestled in the lower ends of said slots.

* * * * *